United States Patent [19]

van der Lely

[11] 4,136,742

[45] Jan. 30, 1979

[54] SOIL CULTIVATING IMPLEMENTS

[76] Inventor: Cornelis van der Lely, 7, Brüschenrain, Zug, Switzerland

[21] Appl. No.: 716,766

[22] Filed: Aug. 23, 1976

[30] Foreign Application Priority Data

Aug. 25, 1975 [NL] Netherlands .......................... 7509994

[51] Int. Cl.² ............................................ A01B 33/06
[52] U.S. Cl. ....................................... 172/59; 172/125
[58] Field of Search ..................... 172/59, 125, 111, 47

[56] References Cited

U.S. PATENT DOCUMENTS

| | | | |
|---|---|---|---|
| 2,050,120 | 8/1936 | Pizarro | 172/59 |
| 2,110,790 | 3/1938 | Daugherty | 172/59 |
| 2,741,173 | 4/1956 | White | 172/59 |
| 3,667,551 | 6/1972 | Lely | 172/59 |
| 3,774,688 | 11/1973 | Lely | 172/59 |

Primary Examiner—Richard J. Johnson
Attorney, Agent, or Firm—Mason, Mason and Albright

[57] ABSTRACT

A rotary cultivator has a row of soil working members mounted on upwardly extending shafts that are geared to a driving shaft extending transverse to the direction of travel. The shafts have soil working tools at their lower ends and transmission gears at their upper ends. Intermediate their ends, the shafts are surrounded by bearings in respective housings. The housings can be disconnected from their supports and the shaft, bearings and housing corresponding to each member can be removed or replaced as a unit. Upon removal, transmission gears are disengaged. The supports for the housings can be bars connected to spaced apart beams of the frame to which gear box - bearing housings are fastened by bolts. Alternatively, an enclosed casing can be formed by an assembly of three spaced apart plates that form an upper gear chamber and a lower trough within which the housings are secured. The rims of the plates can be clamped by bolts and the bearing housings bolted to the lower two plates.

8 Claims, 9 Drawing Figures

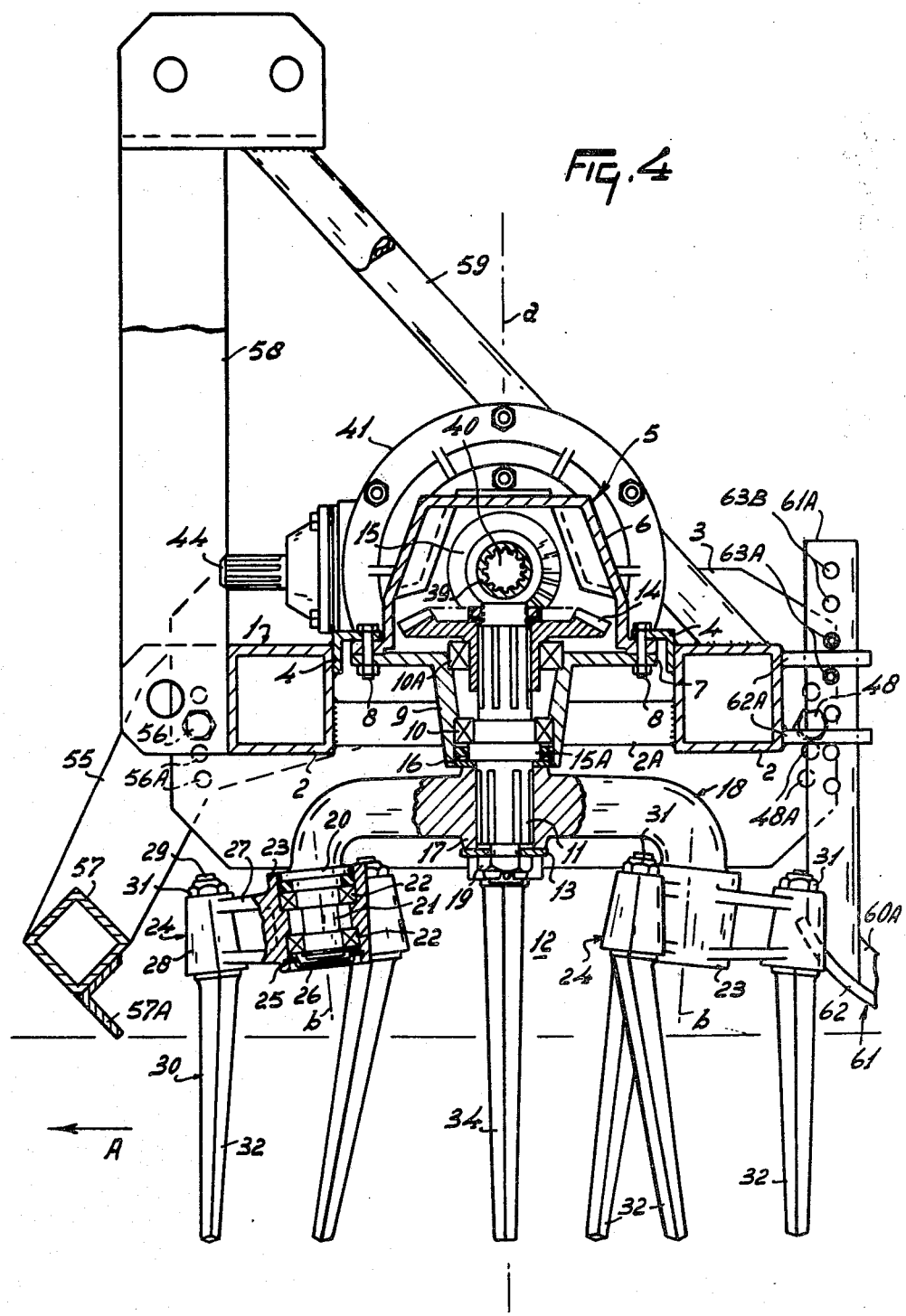

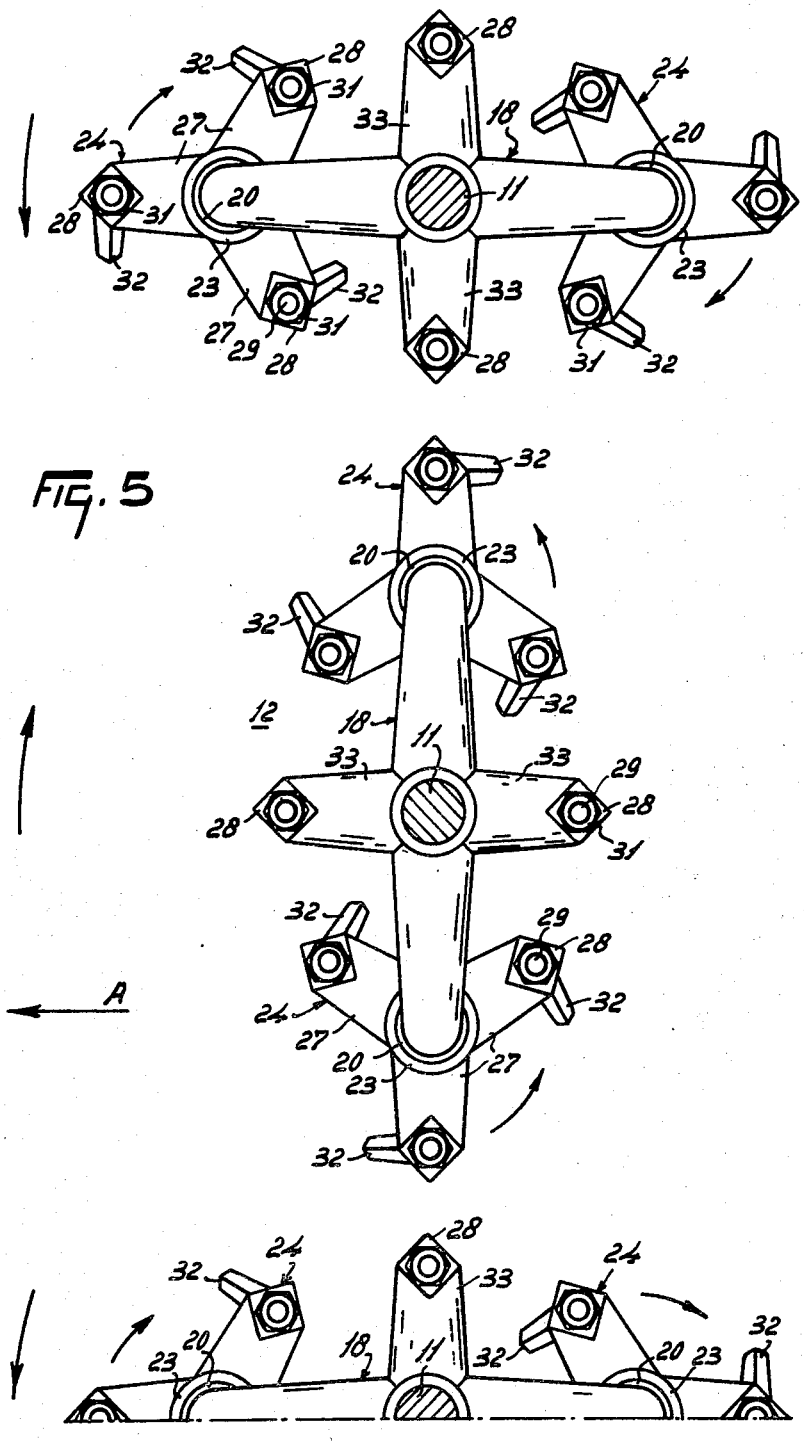

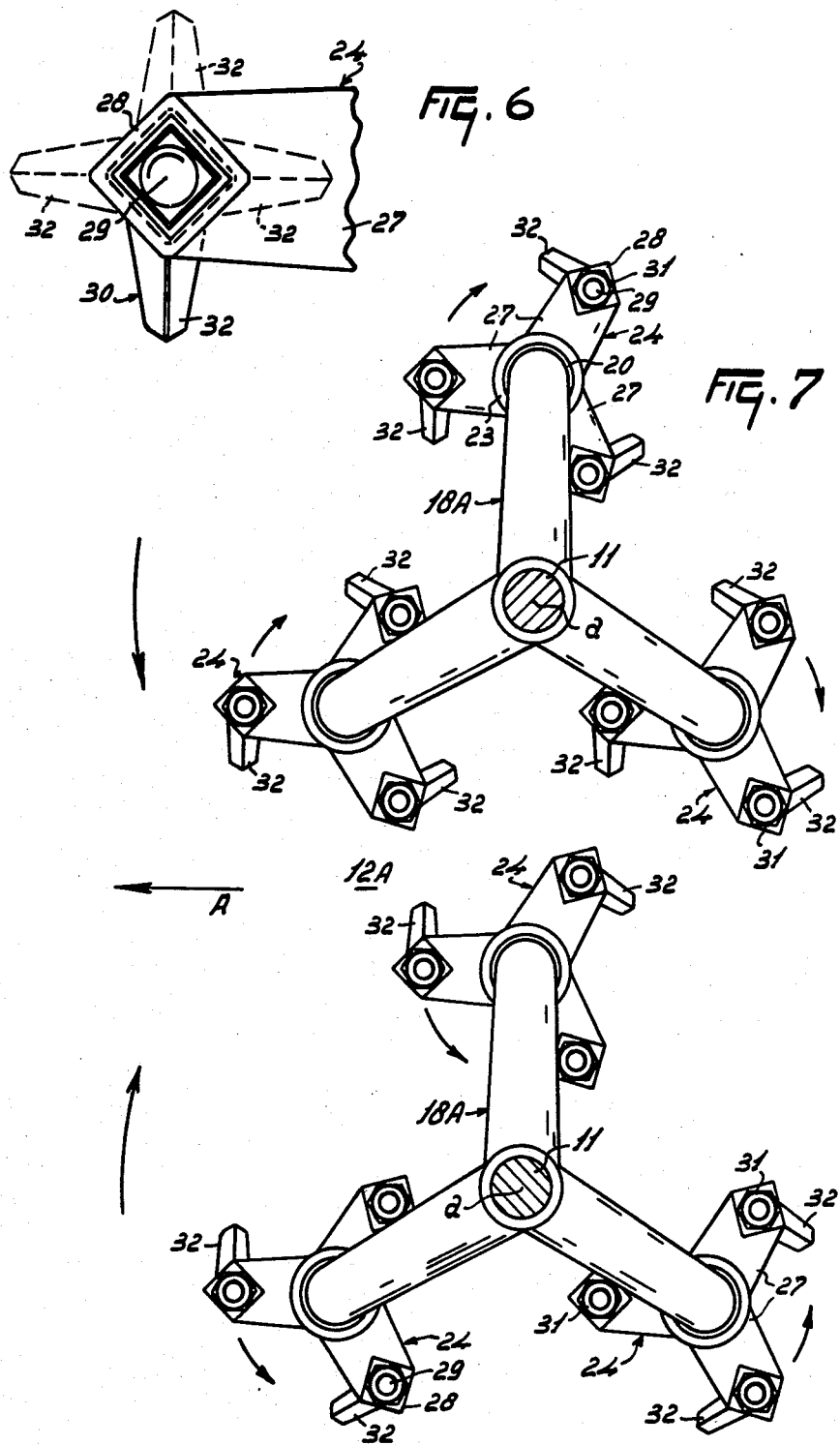

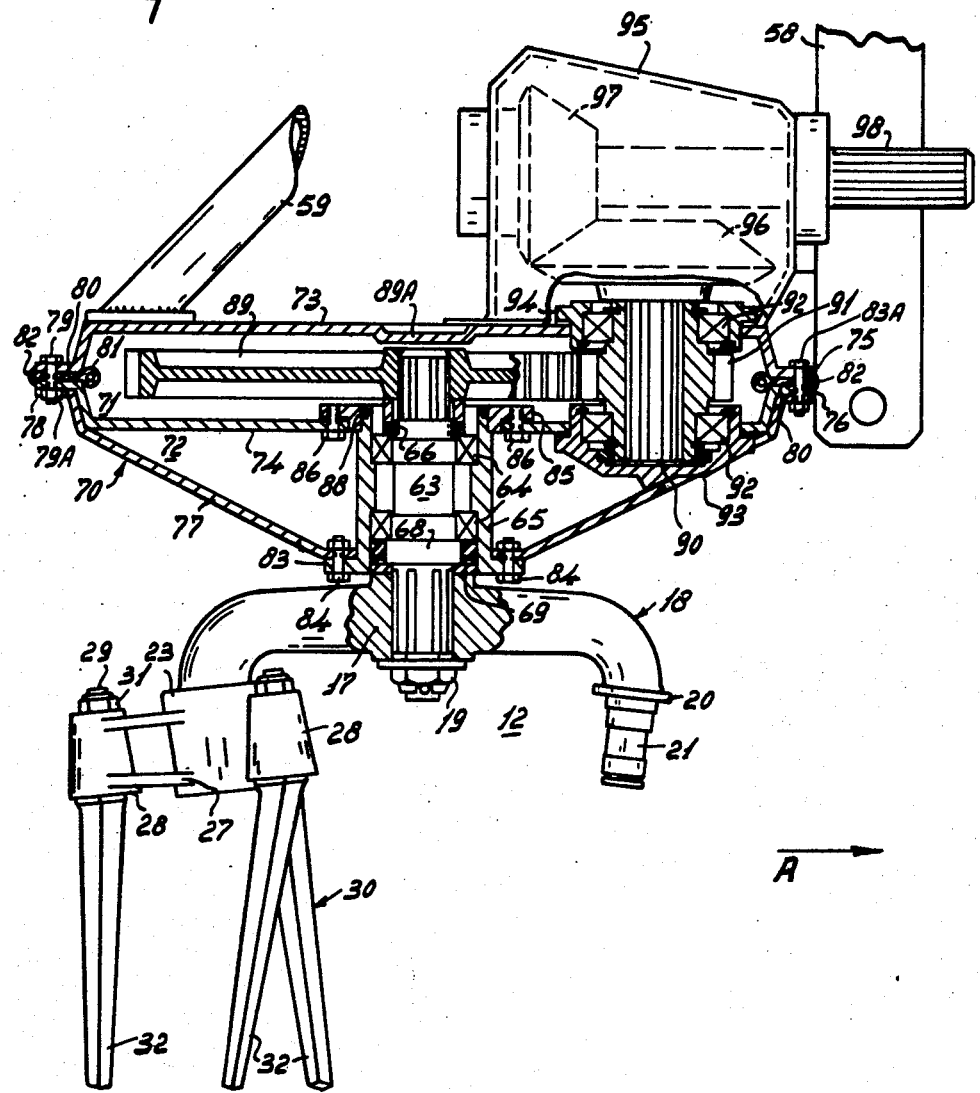

SOIL CULTIVATING IMPLEMENTS

Figure 1:
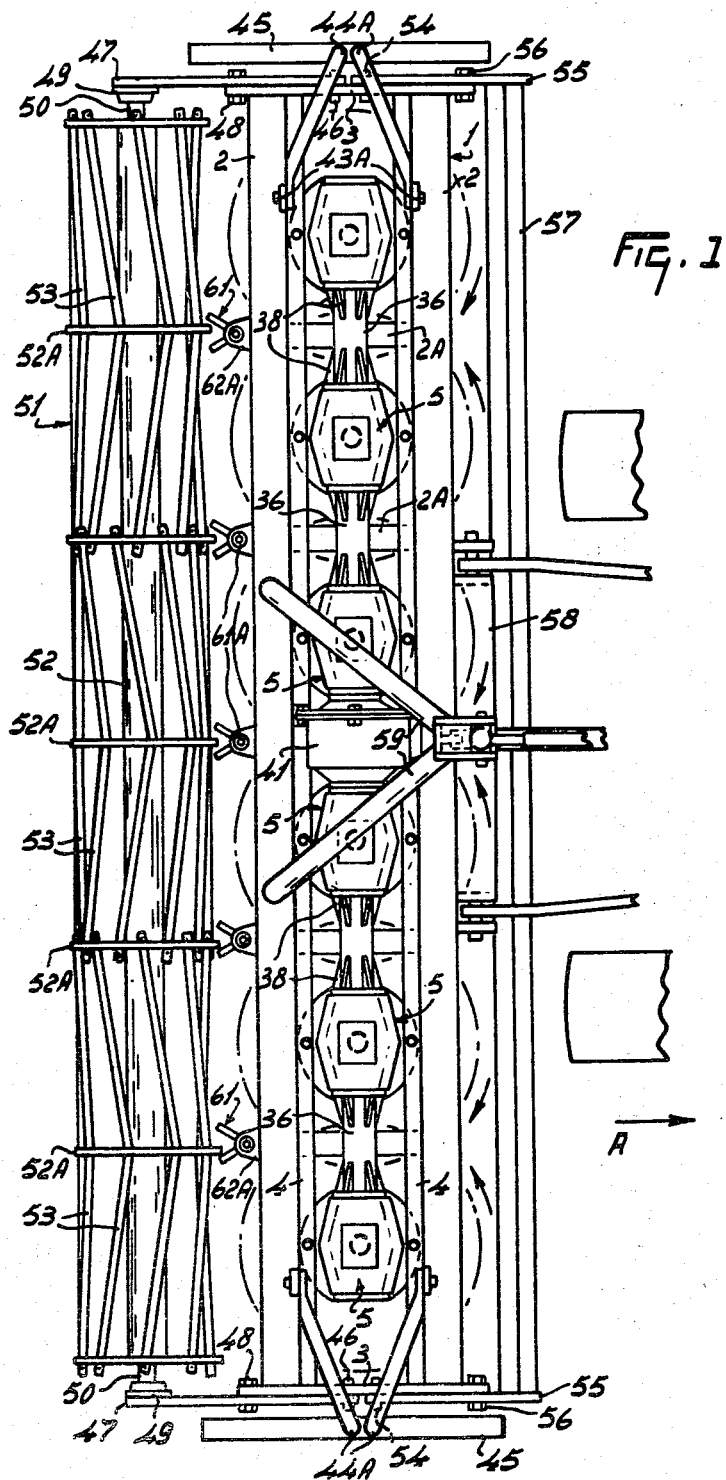
Figure 2:
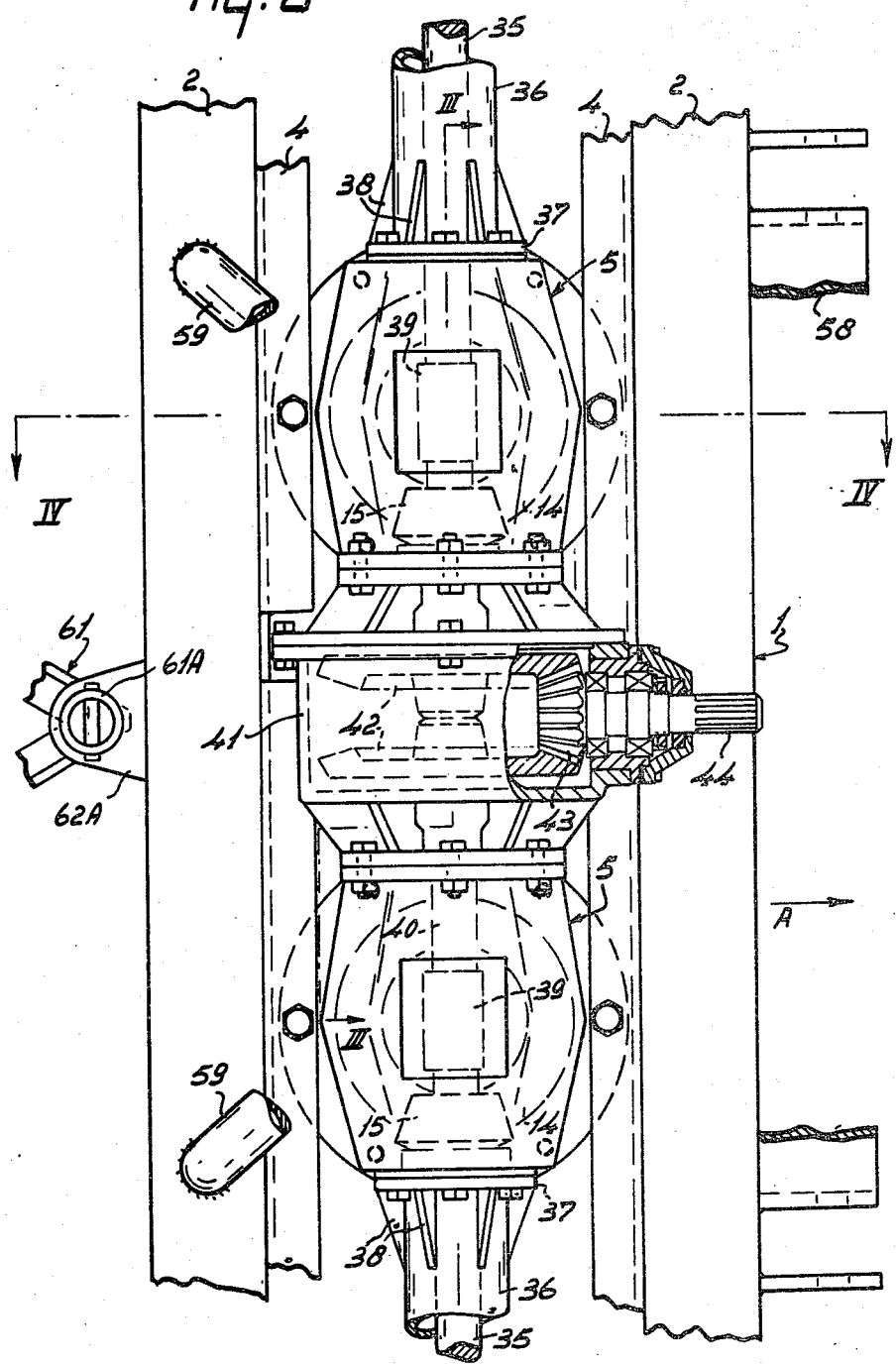
Figure 3:
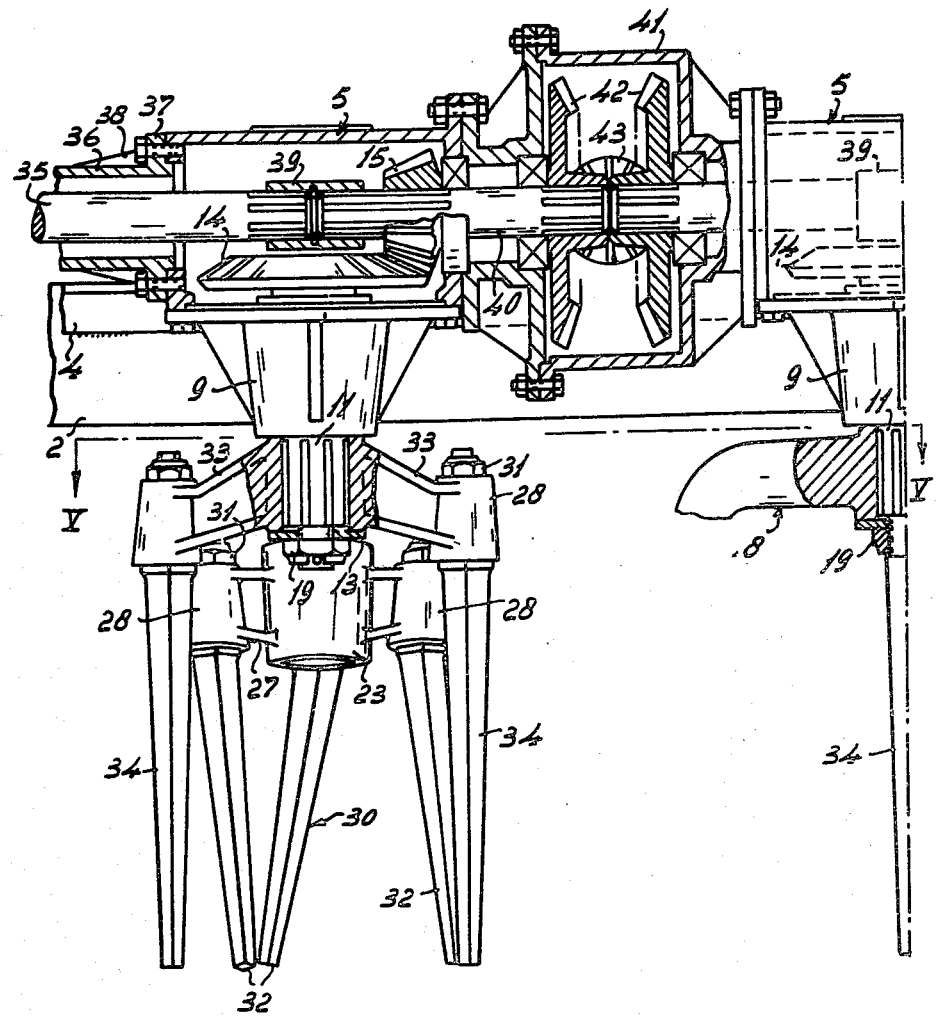
Figure 8:
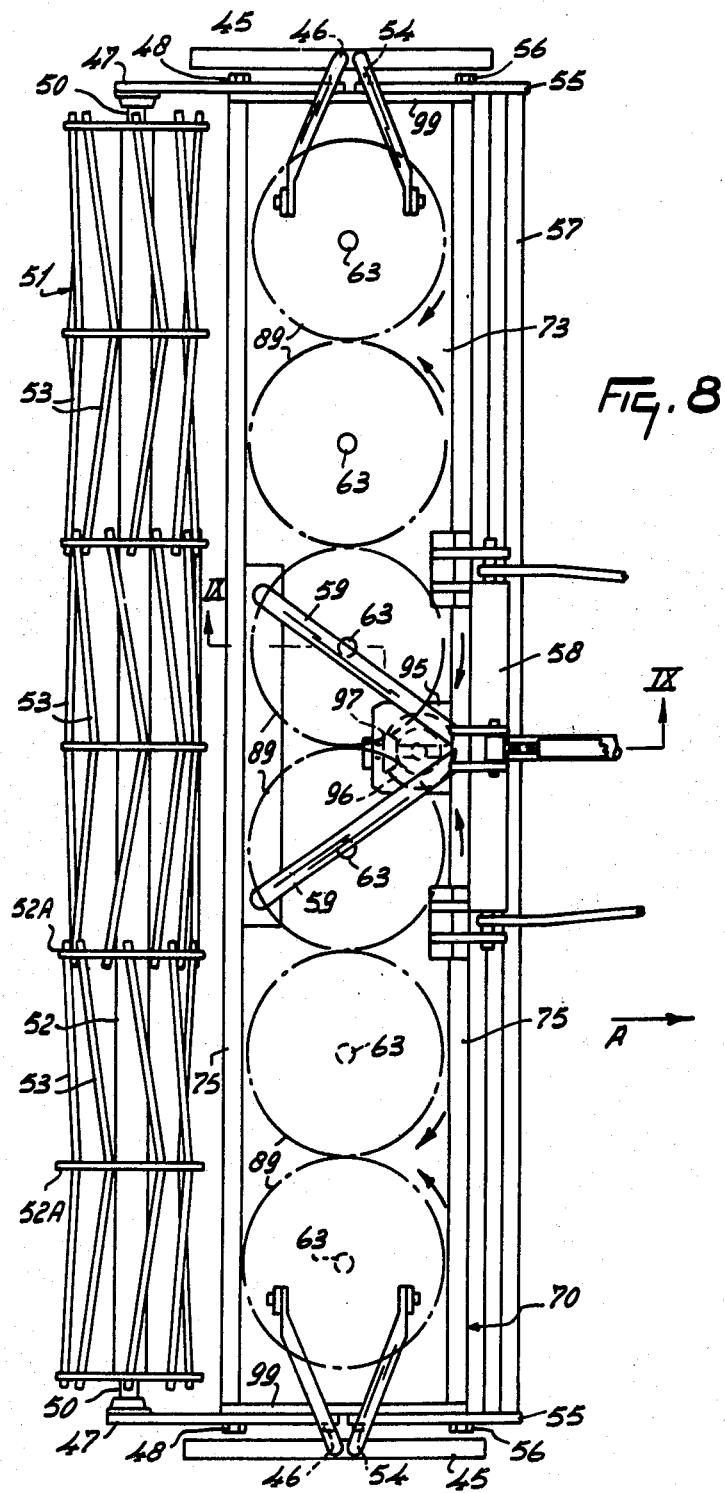

For a better understanding of the invention, and to show how the same may be carried into effect, reference will now be made, by way of example, to the accompanying drawings, in which:

FIG. 1 is a plan view of a soil cultivating implement in accordance with the invention connected to the rear of an agricultural tractor, FIG. 2 is a part-sectional plan view, to an enlarged scale, illustrating a central region of the implement of FIG. 1 in greater detail, FIG. 3 is a section taken on the line III—III in FIG. 2, FIG. 4 is a section taken on the line IV—IV in FIG. 2, FIG. 5 is a section taken on the line V—V in FIG. 3, FIG. 6 is a plan view illustrating in greater detail the construction and arrangement of certain parts that can be seen in FIG. 5, FIG. 7 is a similar view to FIG. 5 but illustrates an alternative construction and arrangement for some parts of the implement, FIG. 8 is a plan view of an alternative form of soil cultivating implements in accordance with the invention connected to the rear of an agricultural tractor, and FIG. 9 is a section, to an enlarged scale, taken on the line X—X in FIG. 8.

Referring to FIGS. 1 to 6 of the accompanying drawings, the soil cultivating implement that is illustrated therein has a supporting frame that is generally indicated by the reference 1, said frame including a pair of parallel and substantially horizontally disposed beams 2, said beams 2 being spaced apart from one another in the intended direction of operative travel of the implement which is indicated by an arrow A with both of them extending transverse, and usually substantially perpendicular, to the direction A. Each of the frame beams 2 is of hollow construction and has a polygonal cross-section which it is preferred should be square as can be seen in FIG. 4 of the drawings. Each beam 2 is arranged so that, with the preferred square cross-section or any other polygonal cross-section, at least one flat side thereof is horizontally or substantially horizontally disposed. The ends of the beams 2 are interconnected by substantially vertically disposed side plates 3 of the supporting frame 1, said side plates 3 being substantially parallel to one another and to the direction A and being dimensioned so that both of them project both forwardly beyond, and rearwardly behind, the two frame beams 2 with respect to the direction A. A number, such as four, of strengthening strips 2A extend substantially horizontally parallel to the direction A in interconnecting relationship with the two frame beams 2. Bars 4 of L-shaped cross-section are secured to the two upright sides of the two square cross-section frame beams 2 that face one another, the permanent connections being effected by welding with the bars 4 located close to the tops of the two beams 2. Each bar 4 has its substantially vertical limb welded to the upright side of the corresponding beam 2 in such a way that the substantially horizontal limb thereof projects from the substantially vertical limb towards the other bar 4. As can be seen in FIG. 4 of the drawings, this arrangement disposes the two substantially horizontal limbs of the two beams 4 at a level just above that of the tops of the two beams 2 and in regularly spaced apart relationship, throughout their lengths, between said beams 2.

Six gear boxes 5 are secured by substantially vertically disposed bolts 8 to the substantially horizontal limbs of the limbs 4 in such a way that said six gear boxes 5 extend in a row in substantially regularly spaced apart relationship in a substantially horizontal direction that is perpendicular to the direction A, the spacings between the two end gear boxes 5 of the row and the corresponding adjacent side plates 3 of the supporting frame 1 being substantially the same as is the distance between any two immediately neighbouring gear boxes 5 in the row (see FIG. 1). Each gear box 5 comprises an upper part 6 and a lower part 7, said parts 6 and 7 being releasably secured to one another by the same bolts 8 as are employed to secure the whole gear box 5 concerned to the substantially horizontally disposed limbs of the bars 4. The upper part 6 of each gear box 5 has its greatest width in a direction parallel to the direction A at its center and tapers from this central region in two opposite directions, that are both perpendicular to the direction A, towards its opposite ends. The lower part 7 of each gear box 5 incorporates a substantially horizontally disposed upper flange from the center of which integrally depends a housing 9 for corresponding axially aligned lower and upper ball bearings 10 and 10A. The bearings 10 and 10A are vertically spaced apart from one another and rotatably carry a corresponding upwardly extending shaft 11 whose longitudinal axis a (axis of rotation) will usually be vertically or substantially vertically disposed. The outer race of each upper ball bearing 10A is supported from beneath by an internal shoulder of the corresponding housing 9 while its inner race surrounds, and bears against a shoulder of, the hub of a corresponding crown wheel or bevel pinion 14 that is internally splined for mounting on the corresponding externally splined upper end of the shaft 11 concerned. Each crown wheel or bevel pinion 14 is disposed inside the upper part 6 of the corresponding gear box 5.

The inner race of each lower ball bearing 10 bears at its lower end against a shoulder 15A of the corresponding shaft 11 while the upper end of its outer race bears against an internal shoulder of the corresponding housing 9. Each shoulder 15A is surrounded by a sealing ring or the like which extends between that shoulder and the internal wall of the corresponding housing 9, the lowermost end of each housing 9 being closed by a ring or washer 16 whose inner edge closely surrounds the shaft 11 concerned immediately beneath its shoulder 15A. The lowermost end of each housing 9 is thus closed to an extent sufficient to ensure lubricant retention and the substantial exclusion of external dirt. The lower surface of each ring or washer 16 bears against the upper surface of a hub 17 of a corresponding rotary soil working member that is generally indicated by the reference 12. The hubs 17 of the six rotary soil working members 12 are internally splined for co-operation with external splines on lower portions of the six shafts 11 that project downwardly from beneath the bottoms of the six housings 9. The hubs 17 are prevented from becoming axially detached from the shafts 11 by washers 13 and retaining nuts 19, the latter being mounted on short screwthreaded stub shafts at the lowermost ends of the shafts 11 and preferably being provided with transverse split pins or the like so as positively to prevent the retaining nuts 19 from working loose during the operation of the implement.

Each hub 17 is disposed integrally at the center of a support 18 of the corresponding rotary soil working member 12 and it will be seen from the drawings that each support 18 comprises two arms that extend in radially opposed relationship from the corresponding hub 17, the outer ends of said two arms being bent over downwardly through angles that are marginally greater than 90°. The lower ends of the bends that have just been mentioned effectively coincide with flanges 20 and, beneath said flanges 20, integral stub shafts 21 are provided. The angular magnitudes of the bends in the arms of each support 18 are, in fact, such that the longitudinal axis b of each stub shaft 21 is inclined at not less than substantially 5° and not more than substantially 10° to the longitudinal axis of a of the corresponding shaft 11, an inclination of substantially 6° being preferred. Since the bends in the arms of each support 18 have magnitudes of marginally more than 90°, the axes b are, of course, in downwardly convergent relationship with the corresponding axes a and it will be noted that, in fact, each axis a and the corresponding two axes b are contained in a common substantially vertically disposed plane.

Each stub shaft 21 rotatably supports, by means of axially spaced apart upper and lower ball bearings 22, a corresponding cultivating tool that is generally indicated by the reference 24. The outer races of the two bearings 22 that correspond to each tool 24 are maintained in spaced apart relationship by internal shoulders of a hub 23, each hub 23 being maintained in its appointed axial position with respect to the corresponding stub shaft 21 by means which includes a circlip 25, each circlip 25 also maintaining a lower cap or cover 26 just inside the lower end of the corresponding hub 23 in dirt-excluding relationship with the lower end of the stub shaft 21 concerned and its bearings 22. Each hub 23 forms part of a corresponding tool support 27 having three straight arms that radiate from said hub 23 at 120° intervals around the axis b of the corresponding stub shaft 21. The radially outer end of each arm 27 carries a corresponding tine holder 28 which is of upwardly tapering configuration. Each tine holder 28 receives the fastening portion 29 of a corresponding rigid tine 30, the fastening portions 29 being retained in the holders 28 by fastening nuts 31 mounted on short screwthreaded parts of the fastening portions 29 that project upwardly above the upper ends of the holders 28. Each upwardly tapering tine holder 28 is of polygonal outer cross-section and it will be seen from the drawings that this cross-section is preferably a square one. The internal bore of each holder 28 has a matching square or other polygonal cross-section and the parts of the fastening portions 29 of the tines 30 that are received therein also have the same cross-section so that said fastening portions 29 cannot turn about their longitudinal axes in the holders 28 once they have been secured therein by the nuts 31. The internal bores of the holders 28 and the parts of the tine fastening portions 29 that co-operate therewith are, like the external profiles of the holders 28, of upwardly tapering configuration.

The fastening portion 29 of each tine 30 is integrally connected to a soil working portion 32 of that tine in such a way that the longitudinal axes of the two straight portions 29 and 32 are inclined to one another, at the integral junction between them, by an angle of not less than substantially 15°. The soil working portion 32 of each tine 30 is of square or at least rectangular cross-section, as illustrated, or has some other polygonal cross-section and it tapers gently in a downward direction towards its lowermost free end or tip from its integral junction with the corresponding fastening portion 29. With the preferred substantially square cross-section of each soil working portion 32 and of the corresponding fastening portion 29 (except the uppermost screwthreaded part thereof), each tine 30 can be set in any one of four different angular positions around the longitudinal axis of the corresponding holder 28, reference being made, in this connection, to FIG. 6 of the drawings which illustrates one such angular setting in full lines and the other three possible angular settings in broken lines. Clearly, all that is required to bring one of the tines 30 from one such angular setting to one of the other possible settings, is to release the co-operating nut 31, draw the fastening portion 29 downwardly until it is clear of the interior of the co-operating holder 28, turn the tine through the required angle of 90° or 180° about the longitudinal axis of its fastening portion 29, enter that fastening portion 29 upwardly in the new setting into the co-operating holder 28, and finally replace the retaining nut 31. It will be appreciated that the ability to reposition the tines 30 of each cultivating tool 24 of each rotary soil working member 12 enables the widths of the strips of soil that are worked by the three tines 30 of each tool 24, during operation of the implement, to be varied.

The distance between the longitudinal axes b of the two stub shafts 21 of each member 12 is, at the level of those stub shafts 21, not greater than substantially 50 centimeters, a spacing of substantially 35 centimeters being preferred. The distance between the axes of rotation a of each pair of immediately neighbouring shafts 11 is not more than substantially 50 centimeters. FIGS. 3 and 5 of the drawings show that, in addition to the arms of the support 18, each soil working member hub 17 has two downwardly and outwardly directed, and diametrically opposed, arms of a further, shorter, support 33 secured to it in such a way that, as viewed lengthwise of the corresponding axis a, the arms of the support 33 extend perpendicular to the arms of the corresponding support 18. The outer ends of the arms of the supports 33 have tine holders 28 that are substantially identical to the previously described holders 28 secured to them and each holder 28 receives the fastening portion of a corresponding rigid soil working tine 34. The tines 34 are constructed and mounted in the same way as the previously described tines 28 except that they are of somewhat greater axial length and that their straight soil working portions are substantially coaxial with their straight fastening portions instead of being inclined thereto at angles of not less than substantially 15° as in the case of the tines 30.

The crown wheel or bevel pinion 14 that is carried at the upper end of each shaft 11 inside the upper part of the corresponding gear box 5 has its teeth in driven mesh with those of a corresponding bevel pinion 15. In the two gear boxes 5 that are located at the opposite ends of the row of six such gear boxes, the corresponding pinions 15 are mounted on substantially horizontally disposed shafts 35. The shafts 35 extend along said row inwardly towards the midpoint of that row through horizontal bearings carried by the walls of the gear boxes 5 and through tubular connecting members 36 that interconnect the successive gear boxes 5. The opposite ends of each tubular connecting member 36 are provided with perpendicular flanges 37, a plurality of strengthening ribs 38 being furnished between each flange 37 and the neighbouring region of the external cylindrically curved surface of the connecting member 36 concerned, said ribs 38 being contained in planes that are parallel to the lengths of the corresponding members 36. The inner ends of the two rotary shafts 35 are connected, inside the upper parts 6 of the corresponding inner pair of gear boxes 5, to substantially coaxial driving shafts 40, the ends of the shafts 35 and 40 being externally splined and the connections between them being effected by surrounding internally splined sleeves 39. If preferred, each sleeve 39 can be fixed to one of the co-operating shafts 35 and 40 so as to function, in effect, as an internally splined socket for the reception of the splined end of the other co-operating shaft.

A central gear box 41 is provided between the two innermost gear boxes 5 in place of one of the tubular connecting members 36, the two driving shafts 40 being rotatably journalled in the central gear box 41 in such a way that their outermost ends project therefrom into the adjoining gear boxes 5. The hubs of two bevel pinions 42 are mounted on the adjoining splined ends of the two driving shafts 40 inside the central gear box 41 and the teeth of a smaller bevel pinion 43 are in driving engagement with the teeth of both bevel pinions 42 so that, during operation, said pinions 42 and their driving shafts 40 will revolve in opposite direction. The bevel pinion 43 is secured to the inner end of a substantially horizontal rotary input shaft 44 (FIG. 2) of the central gear box 41 that projects forwardly from the front of that gear box in a direction parallel or sustantially parallel to the direction A. The forwardly projecting splined or otherwise keyed end of the input shaft 44 is intended to be placed in driven connection with the power take-off shaft at the rear of an agricultural tractor or other operating vehicle by way of an intermediate telescopic transmission shaft that is of a construction which is known per se having universal joints at its opposite ends. The longitudinal axis of the input shaft 44 perpendicularly intersects the common longitudinal axis of the driving shafts 40 upon which the bevel pinions 42 are mounted. The two driving shafts 40 are provided, inside the gear boxes 5 that are the immediate neighbours of the central gear box 41, with further bevel pinions 15 that co-operate drivingly with the corresponding crown wheels or bevel pinions 14 in the same manner as has already been described for the bevel pinions or crown wheels 14 and co-operating bevel pinions 15 in the other four gear boxes 5 of the row of six such gear boxes.

Two shield plates 45 that are usually substantially vertically disposed are arranged near the side plates 3 of the supporting frame 1 immediately beyond the opposite ends of the row of six rotary soil working members 12. The upper edge of each shield plate 45 is connected by a corresponding pair of arms 44A to substantially horizontally aligned pivots 43A which define axes that are substantially parallel to the direction A, said pivots 43A being mounted on top of the frame beams 2 at short distances inwardly from the ends of those beams. The lower edges of the shield plates 45 are shaped to slide over the ground surface in the direction A during operation of the implement and the fact that said plates 45 are turnable upwardly and downwardly about the axes which are defined by the pairs of pivots 43A enables said plates to match any undulations in the surface of the ground that may be met with during operation. The shield plates 45 minimise ridging at the opposite edges of the board strip of soil that is worked by the implement and greatly reduce the number of stones and like potentially dangerous objects that are flung laterally of the path of travel by its rotating soil working members 12. Substantially horizontally aligned stub shafts 46 are provided in central regions of the two side plates 3 and corresponding arms 47 are turnable upwardly and downwardly about those stub shafts 46 alongside the outer surfaces of the two side plates 3. The arms 47 extend rearwardly from the stub shafts 46 with respect to the direction A and project rearwardly beyond the side plates 3. Rear edge regions of the two side plates 3 are formed with curved rows of holes 48A in which each hole 48A is at the same distance from the axis defined by the two stub shafts 46. Each arm 47 is formed with a single hole at the same distance from said axis and that hole can be brought into register with any chosen one of the corresponding row of holes 48A by turning the arm 47 concerned to an appropriate angular position about the stub shaft 56 upon which it is mounted. Bolts 48 are provided for horizontal entry through the single holes in the arms 47 and through chosen holes 48A to fix the arms 47 releasably in corresponding angular settings about said axis. The rearmost ends of the arms 47 with respect to the direction A are provided with substantially horizontally aligned bearings 49 which receive horizontal stub shafts 50 at the opposite ends of a rotatable supporting member in the form of a ground roller 51. The roller 51 comprises a central axially disposed tubular support 52 to which seven substantially circular support plates 52A are secured at regularly spaced apart intervals with two of said plates 52A located at the opposite ends of the support 52. The seven support plates 52A are all substantially vertically disposed in parallel relationship with one another and substantially parallel relationship with the direction A. Each of the support plates 52A is formed close to its circumference with a number of holes that are regularly spaced apart from one another around the longitudinal axis of the central tubular support 52. In the case of each of the first, second, fourth, sixth and seventh of said plates 52A counting from either end of the roller, there are twelve of said holes that are spaced apart from one another at regular 30° intervals around said axis while, in the case of each of the third and fifth plates 52A counting from either end of the roller 51, there are twenty-four of said holes that are spaced apart from one another at regular 15° intervals around the longitudinal axis of the support 52.

Three groups of elongated elements 53 of rodlike formation are entered through the various holes that are close to the peripheries of the support plates 52A and it will be seen from FIG. 1 of the drawings that, considered in a directon parallel to the longitudinal axis of the central support 52 of the roller 51, each element 53 has a length which is a little in excess of the distance between one of the support plates 52A and the plate 52A that is next but one along the roller 51 therefrom. Each element 53 is entered with some clearance through the holes in the three plates 52A with which it co-operates and transverse pins are entered through bores formed very close to its opposite ends to prevent unwanted axial disengagement of each element 53 from the corresponding plates 52A. It can be seen from FIG. 1 of the drawings that the three groups of elements 53 are arranged in immediately succeeding relationship along the length of the roller 51 with said groups successively overlapping at the third and fifth plates 52A counting from either end of the roller 51. It will be remembered that it are these plates that are each formed with twenty-four, rather than twelve, peripheral holes, said twenty-four holes alternately receiving the ends of the twelve elements 53 of each of the groups of those elements that overlap at the plate 52A concerned. It will also be noted from FIG. 1 of the drawings that each element 53 is formed at substantially its midpoint with a sharp angular bend or "kink", said bends or kinks thus registering with the peripheral holes in the second, fourth and sixth support plates 52A counting from either end of the roller 51 and said elements 53 being so disposed that the angular point which is defined by each bend or kink is orientated rearwardly with respect to the direction A when said bend or kink is in contact with or very close to, the ground surface during the operation of the implement. Moreover, each group of twelve bends or kinks and the support plate 52A with which they correspond is contained in a corresponding substantially vertical plane that is substantially parallel to the direction A and which passes midway between the axes of rotation a of the shafts 11 of two co-operating rotary soil working members 12. "Co-operating" means that the directions of positive rotation of the two members 12 concerned are such that parts of those members move rearwardly with respect to the direction A when in the proximity of the planes that have just been defined, reference being made to the arrows shown in FIGS. 1 and 5 of the drawings that denote the directions of operative rotation of the members 12 about the longitudinal axes a of the corresponding shafts 11.

In addition to the stub shafts 46, the central regions of the two side plates 3 also carry substantially horizontally aligned stub shafts 54 that are quite close to the stub shafts 46 but that are located forwardly therefrom with reference to the direction A. Arms 55 are turnable upwardly and downwardly about the stub shafts 54 alongside the outer surfaces of the side plates 3, said arms 55 extending forwardly to locations beyond the leading edges of the side plates 3 with respect to the direction A, the leading ends of said arms 55 being inclined steeply downwardly (see FIG. 4). Curved rows of holes 56A are formed close to the leading edges of the side plates 3 with each hole 56A at the same distance from the axis defined by the aligned stub shafts 54. The arms 55 are formed with single holes that are at the same distance from said axis and bolts 56 are provided for horizontal entry through the single holes in the arms 55 and chosen holes 56A to secure the arms 55 releasably in corresponding angular positions about the substantially horizontal axis defined by the stub shafts 54. The leading lower ends of the arms 55 are perpendicularly interconnected by a substantially horizontally disposed levelling member which comprises a hollow beam 57 having a polygonal cross-section which, as illustrated, is preferably square, the dispostion of said square cross-section beam 57 being such that one diagonal between two opposite corner thereof, as seen in FIG. 4, is substantially vertically disposed. The levelling member also comprises a bar 57A of L-shaped cross-section that is secured to the beam 57 and/or to the arms 55 in such a way that one of its limbs is substantially coplanar with that side wall of the beam 57 which is at the front of the beam with respect to the direction A and in upwardly and forwardly oblique relationship with the ground surface from its lower to its upper edge, the "forward" direction again being relative to the direction A. The leading frame beam 2 is provided, midway between the general planes of the two side plates 3 of the supporting frame 1, with a coupling member or trestle 58 that is of generally triangular configuration as seen in front or rear elevation. The construction and mode of use of the coupling member or trestle 58 are known per se but it will be noted that the connection of the coupling member or trestle 58 to the supporting frame 1 is strengthened by the provision of two tie beams 59 which interconnect the apex of said member or trestle 58 and two horizontally spaced apart locations at the top of the rear frame beam 2. The two tie beams 59 are steeply divergent in both downward and rearward directions from the apex of the coupling member or trestle 58 with respect to the direction A.

In the use of the soil cultivating implement that has been described with reference to FIGS. 1 to 6 of the drawings, its coupling member or trestle 58 is connected to the free ends of the lifting links of a three-point lifting device or hitch at the rear of an agricultural tractor or other operating vehicle in the generally known manner which can be seen in outline in FIG. 1 of the drawings and the rotary input shaft 44 of the central gear box 41 is placed in driven connection with the power take-off shaft of the same tractor or other operating vehicle by way of the aforementioned intermediate telescopic transmission shaft (not shown), of known construction, which has universal joints at its opposite ends. The maximum depth of penetration of the tines 30 and 34 into the soil which is possible is dictated by the level of the axis of rotation of the roller 51 relative to that of the remainder of the implement and this level is set by bringing the arms 47 to appropriate angular positions about the axis afforded by the stub shafts 46 and subsequently entering the bolts 48 through corresponding holes 48A and tightening those bolts, The levelling member which comprises the parts 57 and 57A is also adjusted in position before work commences so that said position will substantially correspond in height, relative to the supporting frame 1, to the position chosen for the roller 51. The bevel pinions 15 are so disposed on the shafts 35 and 40 relative to the crown wheels or bevel pinions 14 with which they drivingly co-operate that immediately neighbouring soil working members 12 are positively rotated about the corresponding axes a in the directions that are indicated by arrows in FIGS. 1 and 5 of the drawings, it being noted that each member 12 revolves about the corresponding axis a in a direction which is opposite to that of its neighbour, or both of its neighbours, in the single row of six members 12. During the positive rotation of the members 12 about the axes a, the cultivating tools 24 will simultaneously revolve in a more or less regular manner around the corresponding axes b in the directions that are indicated by small arrows in FIG. 5. It will be remembered that the axes b are inclined to the corresponding axes a at angles of between substantially 5° and substantially 10°, preferably substantially 6°, the two axes b that correspond to each member 12 being in downwardly convergent coplanar relationship with one another and with the axis a concerned. The disposition of the axes b relative to the axes a ensures that the soil working portions 32 of those tines 30 which, at any instant, are further from the axis a concerned than is their own axis of rotation b, penetrate into the soil more deeply than do the portions 32 of the tines 30 of the same tool 24 that, at the same instant, are nearer to the axis of rotation a than is their own axis of rotation b. This arrangement, together with the inclined relationship of the soil working portions 32 to the vertical, produces the more or less regular rotation of the tools 24 about the axes b in the directions that are indicated by small arrows in FIG. 5, such rotation being ground-driven rotation as the result of the contact of the soil working portions 32 of the tines 30 with the ground. It will be appreciated that, should one or more of the soil working tine portions 32 meet an embedded stone or other substantially immovable obstacle, the rotation of the tool 24 concerned about its axis b may be temporarily halted or even be momentarily reversed in direction. The free rotatability of the tools 24 about the axes b considerably reduces the likelihood of breakage of, or serious damage to, the tines 30 upon meeting more or less immovable obstacles in the soil since, generally speaking, the tines 30 are capable of circumnavigating such obstacles unless they are considerably greater in size than is usual in previously worked agricultural land.

Each rotary soil working member 12, which includes the tines 34 as well as the tined tools 24, works a strip of land having a width of between substantially 55 centimeters and substantially 60 centimeters, the working width of each individual tool 24 being substantially 20 centimeters, In addition to performing its supporting and consequent depth-controlling function, the roller 51 that immediately follows the members 12 over the ground will tend to crush any unbroken lumps of soil that may be left upon the ground surface by the tines 30 and 34 of the members 12. The levelling member which comprises the parts 57 and 57A at the front of the implement brings the soil that is to be worked by the members 12 to a substantially level condition before being engaged by the tines 30 and 34. The use of the levelling member is particularly advantageous when the implement is to deal with previously ploughed land. The shield plates 45 that are disposed beyond the opposite ends of the row of fixed soil working members 12 prevent, or considerably minimise, the formation of soil ridges at the margins of the broad strip of land that is worked by the implement, such soil ridges tending to contain soil that is crumbled to a different extent from the soil that is located between the margins of said strip of land.

It has already been mentioned, with particular reference to FIG. 6 of the drawings, that each tine 30 can occupy any chosen one of four different angular positions about the upwardly extending axis of the holder 28 with which its fastening portion 29 co-operates, the different angular positions of the tines 30 which are possible being such as to vary the speed of rotation of the tools 24 about the axes b and to vary the working widths of the tools 24 and thus of the members 12. The tines 30 are shown in FIGS. 1 to 5 of the drawings, and in full lines in FIG. 6 thereof, as occupying positions in which their soil working portions 32 are trailing with respect to the directions in which the tools 24 will be rotated about the axes b, by ground contact, during operation of the implement. Referring to FIG. 6 of the drawings, it will be seen that each tine 30 can be angularly displaced through 90° to a position in which the working width of the corresponding tool 24 is either increased, or decreased, as compared with the position of the tine 30 that is shown in full lines in FIG. 6, or can be displaced angularly through 180° to a position in which the working width of the tool 24 remains substantially unaltered but in which the soil working portion 32 of the tine is inclined forwardly so as to lead, rather than trail, with respect to the intended direction of ground-driven rotation of the tool 24 about its axis b. Although the tines 34 are illustrated as being straight tines, they may, in fact, have substantially the same formation as the tines 30 in which case each such tine 34 will be capable of occupying any chosen one of four different angular positions relative to its holder 28 in much the same way as is illustrated in FIG. 6 of the drawings for the tines 30. The soil working members 12 of the implement produce a thorough and effective cultivation of the soil since the axes of rotation b of the two tools 24 of each member 12 are spaced apart from one another, at the level of the stub shaft 21, by a distance which is not greater, and is preferably less, than 50 centimeters while the axes of rotation a of immediately neighbouring members 12 are spaced apart from one another by a distance which has a magnitude of not more than substantially 50 centimeters.

The angular bends or kinks in the elements 53 of the roller 51 are located in register, in the direction A, with the regions between the two members 12 of each of the three pairs of those members in which a majority of the soil displaced by the tines 30 and 34 during the operation of the implement is actually delivered rearwardly and it will be remembered that, at substantially ground level, each element 53 extends rearwardly from its angular bend or kink in two different directions that are not diametrically opposite directions. This arrangement tends to spread the displaced soil which reaches the central regions of the three groups of elements 53 of the roller 51 laterally so as to produce an even and substantially unridged broad strip of worked soil. Distributing members that are generally indicated by the reference 61 may be provided, as illustrated, to initiate and improve the sprading effect of the roller 51 that has just been described and that leads to a substantially uniform distribution of the worked soil throughout the width of the broad strip of land that is cultivated by the implement. Each distributing member 61 is turnable about a corresponding upwardly extending axis and is located, with respect to the direction A, between the soil working members 12 and the roller 51. Each member 61 comprises two rearwardly bent-over, and rearwardly divergent, with respect to the direction A, displacing portions 62 that are substantially in register, in the direction A, with the regions between the co-opating pairs of members 12 in which the soil that is worked by those members 12 is delivered rearwardly. Each displacing portion 62 has a corresponding upright rim 60A and each member 61 is carried at the lowermost end of a corresponding arm 61A, said arms 61A being substantially vertically disposed and being entred turnably through holes in upper and lower lugs 62A that are secured to the back wall of the rear frame beam 2 close to the upper and lowermost edges of that wall. Moreover, in addition to being turnably mounted in the holes in the lugs 62A, each arm 61A is upwardly and downwardly adjustable in level relative to the supporting frame 1 to which end it is provided with a vertical row of transverse holes 63B and with a pair of retaining pins 63A that can be entered through any chosen holes 63B at positions immediately above, and below, one of the lugs 62A. This arrangement maintains a substantially constant chosen level of each arm 61A and the corresponding distributing member 61 while allowing that arm and member to be turnable about the substantially vertical, or at least upwardly extending, axis of the arm 61A concerned. The construction that has just been described is illustrated in detail in FIGS. 2 and 4 of the drawings.

Since the roller 51 is provided with three groups of the elongated elements 53, said groups being angularly staggered about the longitudinal axis of the central tubular support 52, and since each element 53 is movable to a very limited extent relative to the support plates 52A (the limitation as to movement being dictated by the positions of the transverse retaining pins at the ends of the elements 53 and the sizes and positions of the holes in the support plates 52A), the roller 51 will rotate smoothly and steadily during operative progress of the implement in the direction A, the elements 53 in each of the three successively adjoining groups thereof being effective in working the soil in co-operation with the foregoing positively rotated members 12.

The construction and disposition of the gear boxes 5 and 41 are such that the drive transmission that is accommodated therein is readily accessible for partial or complete dismantling and installation purposes. For example, it is only necessary to remove the appropriate bolts 8 to enable the lower part 7 of one of the gear boxes 5 to be removed downwardly together with the corresponding bearing housing 9, crown wheel or bevel pinion 14 and shaft 11. Obviously, replacement is effected in an equally simple manner merely by introducing the removed assembly upwardly into position from beneath the supporting frame 1. The upper parts 6 of the gear boxes 5 remain in their appointed positions since they are laterally interconnected by the tubular members 36. It is noted that, in the central gear box 41, drive is transmitted from the rotary input shaft 44 to the coaxial driving shafts 40 by two separate bevel pinions 42 rather than by way of a single bevel pinion. This arrangement enables the bevel pinions 42 to be of considerably lighter construction than would be necessary if a single bevel pinion were to be employed.

FIG. 7 of the drawings illustrates a modification of the implement of FIGS. 1 to 6 in which the soil working members 12 are replaced by rotary soil working members 12A each of which members 12A comprises a support 18A having three arms which radiate from the corresponding hub 17 at 120° intervals around the axis a concerned. The tines 34 and their supports 33 are not provided in the embodiment of FIG. 7 and, instead, the free end of each arm of each support 18A is provided with a corresponding stub shaft 21 upon which a rotary ground-driven cultivating tool 24 is rotatably mounted in the same manner as has already been described with reference to FIGS. 1 to 6 of the drawings. In the case of the embodiment of FIG. 7 of the drawings, the three axes of rotation b of the three cultivating tools 24 of each member 12A are all inclined to the corresponding axis a by the same angles as in the case of the embodiment of FIGS. 1 to 6 of the drawings and, in fact, are contained in a downwardly tapering imaginary conical surface whose imaginary apex, where the three axes b intersect, is also coincident with the corresponding axis a, the latter affording the central axis of the imaginary cone.

FIGS. 8 and 9 of the drawings illustrate a soil cultivating implement in accordance with the invention which is similar, or identical, in many respects, to the implement that has already been described with reference to FIGS. 1 to 6 of the drawings. The similar or identical parts of the implement of FIGS. 8 and 9 of the drawings are denoted by the same references as have already been employed in FIGS. 1 to 6 and will not be described again in detail. In the embodiment of FIGS. 8 and 9 of the drawings, each rotary soil working member 12 is mounted on a lower end region of a corresponding substantially vertical, or at least upwardly extending, shaft 63. Each shaft 63 is rotatably supported by axially spaced apart upper and lower ball bearings 64 that are mounted internally of a surrounding bearing housing 65, the outer races of the two ball bearings 64 abutting against internal shoulders of the housing 65. The inner race of each upper bearing 64 surrounds a collar of the corresponding shaft 63 and, immediately above that collar, the shaft 63 is formed with a short screwthreaded portion. A nut 66 is mounted on the screwthreaded portion to bear downwardly against the upper surface of the inner race of the corresponding upper ball bearing 64, a sealing ring or other stuffing material being interposed between the nut 66 and the bearing 64. The lower surface of the inner race of each lower ball bearing 64 abuts against the top of a further collar 68 of the corresponding shaft 63 and the hub 17 of the corresponding soil working member support 18 is secured against axial displacement along the splined portion of the corresponding shaft 63 that projects from beneath the bottom of the bearing housing 65 concerned by the retaining nut 19, a co-operating washer at the lower end of the hub 17 and a sealing washer 69 at the upper end thereof. Moreover, as can be seen in FIG. 9 of the drawings, each collar 68 is surrounded, above the corresponding sealing washer 69, by a sealing ring, the sealing members being arranged to retain a lubricant supply for the bearings 64 and to exclude external dirt from that lubricant supply. It will be noted that each sealing washer 69 closes the bottom of the corresponding bearing housing 65. Each bearing housing 65 is sustained by a sheet steel part of a frame portion that is generally indicated by the reference 70, the longitudinal axis of the hollow frame portion 70 extending substantially horizontally transverse, and usually substantially horizontally perpendicular, to the intended direction of operative travel A of the implement. The longitudinal axis of the hollow frame portion 70 is also contained in a substantially vertical, or at least upwardly extending, plane that contains the axes of rotation a of the six central shafts 63 of the six soil working members 12, said plane being disposed transverse, and usually substantially perpendicular, to the direction A.

The hollow frame portion 70 comprises an upper chamber 71 and a lower trough 72 located immediately beneath the chamber 71, the longitudinal axes of said chamber 71 and trough 72 being parallel to one another and substantially horizontally disposed. As can be seen in FIG. 9 of the drawings, the chamber 71 is of substantially oblong cross-section while the trough 72 has a substantially isosceles triangular cross-section, the broad base of said triangle being located uppermost to coincide with the bottom of the chamber 71. The chamber 71 has upper and lower walls 73 and 74 that are both formed from sheet material, the upper wall 73 comprising a substantially horizontal portion that has obliquely downwardly divergent front and rear edges of symmetrically identical construction. Each of said front and rear edges is provided with a horizontally bent-over clamping rim 75 that extends throughout the length (transverse to the direction A) of the edge of the wall 73 concerned. The lower wall 74 is of inverted substantially symmetrically identical construction to the upper wall 73 and thus comprises a substantially horizontal portion flanked by upwardly obliquely divergent front and rear edges that are both formed with horizontally bent-over clamping rims 76 that, like the rims 75, extend throughout the transverse lengths of the front and rear edges of the wall 74. With this substantially symmetrically identical construction of the walls 73 and 74, the rims 75 of the wall 73 are spaced from the horizontal portion thereof by substantially the same distance as are the rims 76 from the substantially horizontal portion of the wall 74. The trough 72 has a substantially horizontally disposed central portion that is relatively narrow in the direction A, said central portion being a portion of a sheet metal wall 77 which is bent over at the front and rear edges of said portion so as to form further symmetrically disposed upwardly divergent portions. The upper edges of these divergent portions are, in turn, bent over to form further less steeply divergent portions which bear against the outer surfaces of the upwardly divergent front and rear edges of the lower wall 74 of the chamber 71, said less steeply divergent portions terminating in horizontally bent-over clamping rims 78 whose upper surfaces abut against the lower surfaces of the clamping rims 76 at the front and rear edges of said lower wall 74. The clamping rims 75 and 76 of the upper and lower walls 73 and 74 of the chamber 71 are secured to one another by vertically disposed bolts 79 with the interposition of a gasket 80 formed from a hard synthetic plastics material. The gasket 80 is strip-shaped and its opposite edges are formed with inner and outer rims 81 and 82 of different shapes. The inner rims 81 are of hollow tubular configuration and lie between the upwardly and downwardly inclined edges of the walls 73 and 74 whereas the outer rims 82 are of solid formation and lie against the outermost extremities of the superposed clamping rims 75 and 76, each rim 82 having a substantially flat inner surface which sealingly engages said extremities and a curved outwardly directed surface.

The rims 78 of the sheet metal wall 77 of the lower trough 72 strengtheningly support the upper chamber 71 and are secured to the clamping rims 75 and 76 of the chamber by bolts 83A arranged in alternate relationship with the bolts 79. As can be seen in FIG. 9 of the drawings, the rims 78 are formed with large holes that receive nuts 79A co-operating with the shanks of the bolts 79 whereas smaller holes receive the shanks of the bolts 83A so that, when their nuts are tightened, the rims 78 are clamped to the rims 75 and 76 and intervening gaskets 80. Substantially vertically registering holes are formed in the lower wall 74 of the chamber 71 and in the substantially horizontally disposed central portion of the wall 77 of the trough 72, said holes being circular and being so disposed that imaginary lines joining their centers are spaced apart from one another by distances of not more than substantially 50 centimeters, said imaginary lines coinciding with the axes of rotation a of the shafts 63. The lowermost end of each bearing housing 65 has an outwardly directed flange 83 and this flange is releasably secured to the margin of a corresponding lower hole in the wall 77 by substantially vertically disposed bolts 84. The corresponding upper hole in the wall 74 has a ring 85 securely mounted in it by substantially vertically disposed bolts 86 which are entered through openings in the material of the wall 74 which surrounds the hole. The ring 85 has a downwardly directed rim which extends throughout substantially the whole of the thickness of the material of the wall 74 and cooperates in accurately surrounding relationship with a reduced diameter upper extremity of the corresponding bearing housing 65. A lubricant seal 88 is arranged in a groove in the reduced diameter portion of the bearing housing 65 that co-operates with the inner surface of the corresponding ring 85 and, if desired, a further lubricant seal may be arranged in the inner cylindrical wall of the ring 85 to ensure that there is an effective seal against oil or other lubricant leaking downwardly into the trough 72 from the interior of the chamber 71. It is noted that, with this construction, the bearing housings 65, together with their shafts 63 and bearings 64, can be entered upwardly into their appointed positions from beneath the frame portion 70, only installation and tightening, or temporary removal, of the bolts 84 being necessary to effect rapid installation, or removal when required.

An upper splined portion of each shaft 63 is provided, inside the upper chamber 71, with a straight- or spur-toothed pinion 89, there thus being a total of six of the pinions 89 (see FIG. 8) arranged with the teeth of each pinion in mesh with those of its neighbour, or each of its neighbours, in the single row thereof. The upper wall 73 of the chamber 71 is provided with six depressions 89A (FIG. 9) and these depressions are in register with the upper ends of the six shafts 63 and the hubs of the corresponding six pinions 89. The depressions 89A serve effectively as stops, particularly for the hubs of the pinions 89, during the insertion of the bearing housings 65 and their shafts 63 and other associated parts from the bottom of the trough 72. During such insertion, the upper splined end of the shaft 63 concerned makes sliding engagement with the internal splines of the hub of the corresponding pinion 89 and that pinion is prevented from being pushed upwardly to any significant extent by the registering depression 89A. The lubricant seal 88 co-operates with the ring 85 in preventing downward leakage of lubricant from the chamber 71 into the trough 72 and installation of the bolts 84, whose co-operating nuts are already fixed in place, is all that is necessary to retain the housing 65 and the parts which it carries in its appointed position. A gear box 95 is mounted substantially centrally across the width of the frame portion 70 at the top and front thereof with respect to the direction A. The gear box 95 is provided with a substantially horizontally disposed rotary input shaft 98 whose leading splined or otherwise keyed end projects forwardly from the front of the gear box in substantially the direction A for driven connection to the power take-off shaft of an agricultural tractor or other operating vehicle with the aid of an intermediate telescopic transmission shaft (not shown) that is of a construction which is known per se having universal joints at its opposite ends. The input shaft 98 carries, inside the gear box 95, a bevel pinion 97 whose teeth are in driving mesh with those of a larger bevel pinion 96. The bevel pinion 96 is secured to the uppermost end of a substantially vertical disposed splined shaft 90 which is provided, throughout most of its length, with the hub of an internally splined straight- or spur-toothed pinion 91 of smaller size than the pinions 89. Upper and lower ends of the hub of the pinion 91, and thus the shaft 90, are rotatably supported by axially aligned and vertically spaced apart ball bearings 92, said bearings 92 being arranged in lower and upper bearing housings 93 and 94, respectively, which housings are arranged in openings in the lower and upper walls 74 and 73 of the chamber 71. The lower bearing housing 93 is also partly located in an opening in the leading upwardly divergent portion of the wall 77 of the trough 72. The top of the upper bearing housing 94 is located inside a lower region of the gear box 95.

The opposite ends of the frame portion 70 are closed by side plates 99 that extend substantially vertically parallel to one another and to the direction A, said side plates being equivalent to the previously described side plates 3 even though they are somewhat different in shape and extent to the side plates 3. Thus, they have the roller 51 that affords a rotatable supporting member of the implement connected to them by the arms 47 so as to be upwardly and downwardly adjustable in level relative to the frame portion 70 and also have the levelling member that is afforded by the parts 57 and 57A adjustably connected to them in a similar manner. The previously described coupling member or trestle 58 of generally triangular configuration is fastened to the front of the frame portion 70 midway between the general planes of its two side plates 99 and the apex of the coupling member or trestle 58 is connected to an anchorage plate at the top and rear of the frame portion 70 by the two tie beams 59 which are in steeply downwardly and rearwardly divergent relationship with one another, with respect to the direction A, from said coupling member or trestle 58 to the anchorage plate.

The operation of the implement that as been described with reference to FIGS. 8 and 9 of the drawings is very similar to that of the implement previously described with reference to FIGS. 1 to 6 of the drawings. However, in this case, major components of the positive drive transmission to the soil working members 12 are contained within the upper chamber 71 of the frame portion 70 which chamber 71 is effectively sustained, from beneath, by the trough 72. Each straight- or spur-toothed pinion 89 has an effective diameter of substantially 50 centimeters and the chamber 71 within which said pinions 89 are disposed in constructed and arranged to contain a supply of oil or other lubricant without significant leakage. The six bearing housings 65 are located principally inside the trough 72 and any one, or more, of them can be readily removed and replaced, together with the corresponding shaft 63 and bearing 64, by releasing, or replacing, the bolts 84 and moving the assembly in question either downwardly or upwardly in a direction perpendicular to the longitudinal axis of the frame portion 70. It is noted that, with this arrangement, it is not necessary to remove any of the pinions 89 from the chamber 71. If access to the pinions 89 is required to enable one or more of them to be replaced, or for any other purpose, it is necessary to undo the bolts 79 and 83A and to remove temporarily the upper wall 73 of the chamber 71. Although not illustrated in the accompanying drawings in respect of either of the basic embodiments that have been described, it is noted that the drive transmission to the soil working members 12 or 12A may include a simple change-speed gear constructed and arranged to enable the shafts 11 or 63, and thus the members 12 or 12A, to be rotated at any chosen one of a number of different speeds in response to a single more or less standard input speed of rotation applied to the shaft 44 or 98. It will be appreciated that different speeds of rotation of the members 12 or 12A are appropriate to soils of different natures and consistencies, to the operating conditions such as the moisture content of the soil, and to the degree of fineness of the soil that is desired at the end of the operation. It is noted that, since alternate holes in the rims 78 of the trough 72 are large enough to accommodate the nuts 79A that cooperate with the bolts 79 without said rims 78 themselves being restrained by those nuts and bolts 79/79A. it is possible to remove the trough 72 from the chamber 71, by releasing only the bolts 83A, so that the upper and lower walls 73 and 74 of the chamber 71 remain united by the bolts 79 and nuts 79A thus preventing the loss of any lubricant from the interior of the chamber 71.

Although various features of the soil cultivating implements that have been described and that are illustrated in the accompanying drawings will be set forth in the following claims as inventive features, it is emphasised that the invention is not necessarily limited to those features and that it includes within its scope each of the parts of each soil cultivating implement embodiment that has been described, and/or that is illustrated in the accompanying drawings, both individually and in various combinations.

What we claim is:

1. A soil cultivating implement comprising an elongated frame portion and a transverse row of rotatable soil working members being mounted on said frame portion, each soil working member having an upwardly extending shaft that defines a corresponding axis of rotation for that member and driving means engaging said shaft, said driving means comprising a gear connection for the shaft and said connection being supported by a respective bearing housing, said frame comprising an assembly of three spaced apart plates located above one another, said plates defining the walls of an upper chamber and a lower trough, said gear connection being positioned within said chamber, at least in part, and said housing together with bearings being located within said trough, said housing being releaseably secured in openings of the lower two plates, said member together with corresponding shaft, housing and bearings being installable into and removable from said trough.

2. An implement as claimed in claim 1, wherein said housing has a bottom flange secured in the opening in the lowermost plate and an upper end that extends into said chamber through the intermediate plate opening.

3. An implement as claimed in claim 2, wherein a fastening ring in the intermediate plate opening cooperates with said upper end of the housing, said upper end having a narrowed configuration and a circumscribing groove, a sealing ring in said groove that cooperates with the surface of said ring, a further seal being positioned between said flange and said lowermost plate.

4. An implement as claimed in claim 1, wherein the uppermost plate has a depression in register with the upper end of the soil working member shaft.

5. An implement as claimed in claim 1, wherein said three plates have outer rims positioned adjacent one another and bolt fastenings secured the plates together, the upper two plates having cooperating clampling rings and a gasket being positioned between said rims, said gasket being a strip of relatively hard synthetic plastic material with an enlarged inner end.

6. An implement as claimed in claim 1, wherein said gear connection comprises a spline connection to a pinion located within said chamber and the respective shaft is removable from said pinion which remains in the chamber.

7. An implement as claimed in claim 1, wherein an upwardly extending output shaft is located within the chamber, adjacent the center of said row, said output shaft being drivingly connected with pinion gears mounted on the shafts of corresponding soil working members, said output shaft being rotatably supported by upper and lower bearing members that are mounted on the two upper plates.

8. An implement as claimed in claim 7, wherein said lower bearing member is located in a further bearing housing that is secured in said trough.

* * * * *